United States Patent [19]

Brown et al.

[11] 4,151,408
[45] Apr. 24, 1979

[54] SUN TRACKING CONTROL SYSTEM

[75] Inventors: Russell L. Brown, Oklahoma City; Charles M. Burton, Edmond, both of Okla.

[73] Assignee: Brown Manufacturing Company, Oklahoma City, Okla.

[21] Appl. No.: 664,261

[22] Filed: Mar. 5, 1976

[51] Int. Cl.² .............................................. G01J 1/20
[52] U.S. Cl. ................................ 250/203 R; 126/270; 356/152
[58] Field of Search ............... 250/203 R, 208, 210, 250/237 R, 201; 126/270, 271; 356/152, 141

[56] References Cited

U.S. PATENT DOCUMENTS

| | | | |
|---|---|---|---|
| 3,177,367 | 4/1965 | Brown | 250/203 R |
| 3,308,299 | 3/1967 | Dardarian | 250/203 R |
| 3,917,942 | 11/1975 | McCay | 250/203 R |

Primary Examiner—Alfred E. Smith
Assistant Examiner—David K. Moore
Attorney, Agent, or Firm—Laney, Dougherty, Hessin & Beavers

[57] ABSTRACT

A control circuit for tracking of a heat radiation source which functions to maintain heat collection structure in optimum alignment with the source thereby to enable maximum efficiency of heat collection; the control circuit includes a threshold circuit for sensing ambient light level to provide enablement control to A-C power circuitry which energizes the heat collector orienting drive system, and the threshold circuit also functions to automatically invert the heat collector to a protected position upon detection of insufficient threshold voltage; and, the circuit further comprises a tracking section energized by a radiation sensor to cause intermittent energization of the drive system to further enable intermittent bi-directional tracking movement of the heat collector, such tracking circuitry being enabled by detection of sufficient threshold voltage.

10 Claims, 5 Drawing Figures

SUN TRACKING CONTROL SYSTEM

BACKGROUND OF THE INVENTION

1. Field of the Invention

The invention relates generally to bi-directional tracking circuitry and, more particularly, but not by way of limitation, it relates to improved sun tracking control apparatus for use in solar energy heat collection applications.

2. Description of the Prior Art

The prior art includes many types of mechanical structure for tracking the sun or other heat radiation source for the purpose of gaining optimum heat collection. In each case, the control circuitry for automatic direction of such structure includes the characteristic control elements for achieving those ends necessitated by the particular form of heat collection application. There is much present activity in the area of solar energy collection due to recent demands in energy conservation and new, more efficient modes of energy utilization, and the circuitry in the present invention endeavors to provide a reliable yet highly economical control circuit structure, which, while enabling the necessary solar energy tracking functions, also brings about desirable protective functions. A preliminary search of the prior art discloses no control circuitry having the similar enablement and automatic positioning functions of the present invention.

SUMMARY OF THE INVENTION

The present invention contemplates control circuitry for sun tracking solar energy collection structure, which control circuitry is particularly directed to automatic safeguard features as well as increased tracking adjustability to enable optimum sun tracking and maximum efficiency of energy conversion. The control system consists of a threshold section and a tracking section wherein the threshold section senses a first light condition to derive an enabling output for control of the tracking section such that a positioning drive system, as for heat or sunlight collection structure, is enabled to track in optimum manner and to move to a safeguard position upon absence of threshold enablement.

Therefore, it is an object of the present invention to provide tracking control circuitry for sun-oriented energy collection structure which is highly efficient yet economical to manufacture while providing both full tracking capability and additional safeguard functions.

It is also an object of the present invention to provide solar energy collection control circuitry which readily enables selected maintenance and care functions relative to the solar collection structure.

Finally, it is an object of the present invention to provide solar collection control circuitry having a novel direct radiation sensing assembly in combination with an ambient radiation sensing assembly which assembly provides full operational control of solar tracking and energy collecting structure.

Other objects and advantages of the invention will be evident from the following detailed description when read in conjunction with the accompanying drawings which illustrate the invention.

DETAILED DESCRIPTION OF THE INVENTION

Figure 1:
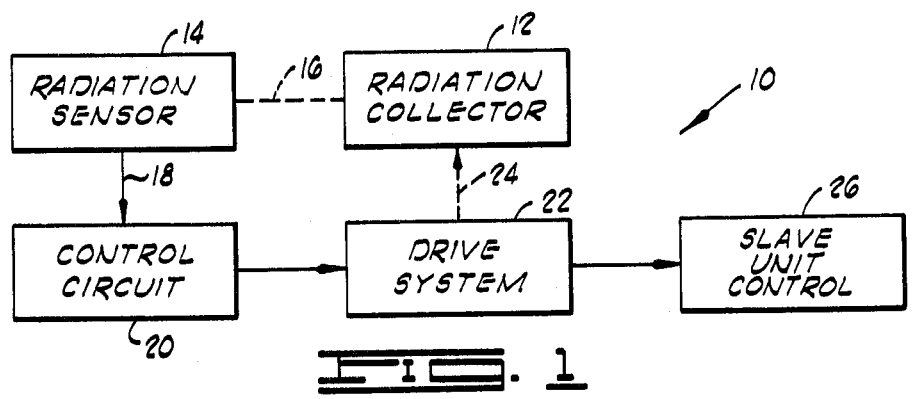
FIG. 1 is a functional block diagram of an energy responsive system utilizing circuitry constructed in accordance with the present invention.

FIG. 1 illustrates one form of radiation responsive system which may utilize circuitry constructed in accordance with the present invention. A system 10 consists of a movable radiation collector 12 having a radiation sensor 14 rigidly connected thereto by a mechanical link 16. Radiation sensor 14 is connected and directed consistent with the requirements of radiation collector 12. Electrical output from radiation sensor 14 is then applied via connection 18 to a control circuit 20 which, in turn, relays position information for control of drive system 22. Drive system 22 then functions via a mechanical input linkage 24 to control or position radiation collector 12 in accordance with the fed back information. In many such situations, a plurality of radiation collectors 12 need be controlled in uni-axial manner such that a single radiation sensor 14 and control circuit 20 may be utilized to transmit drive information through drive system 22 to one or more slave unit controls 26 as located at any of various proximate or remote locations. Slave unit controls 26 would then function in like manner with respective drive systems to control an associated radiation collector to maintain parallactic collector positioning.

Figure 2:
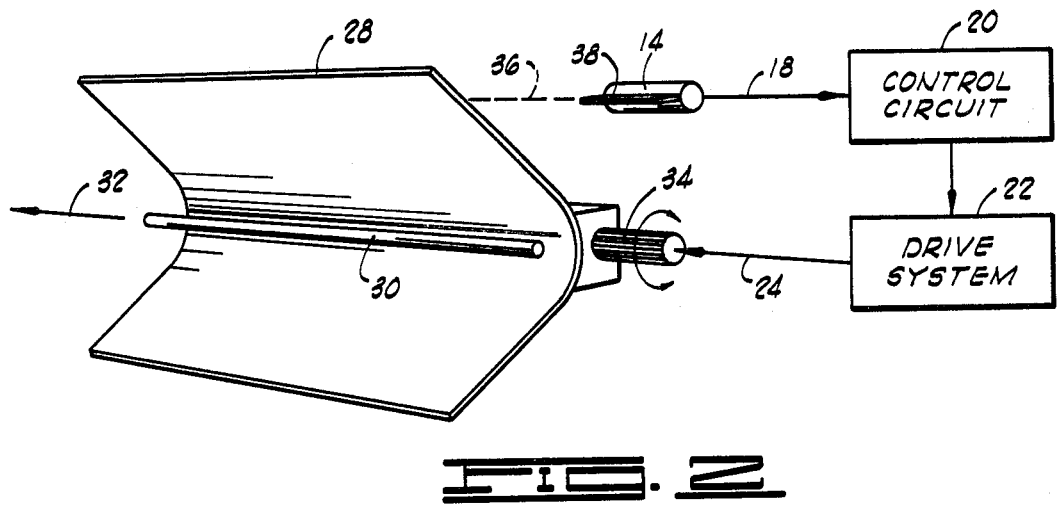
FIG. 2 is a perspective view of one form of solar energy collection structure which may utilize the present invention.

FIG. 2 illustrates one form of solar energy collection structure which may be utilized in a system as set forth in FIG. 1. The system utilizes a solar energy collection structure in the form of a linear parabolic reflector 28, i.e., reflector 28 is folded about a single axis in parabolic cross-sectional configuration. The parabolic reflector 28 is then suitably formed of a highly reflective material which, when properly directed, all focus all incident radiation rays to such as a heat collector 30 which is supported to lie along the focal axis of reflector 28. Such solar energy collection structure is well-known in the art and heat collector 30 may be any of various means, e.g. heat-absorbing pipe carrying water or other heat absorbing vehicle for ultimate circulation and heat removal as shown generally via arrow 32.

It is contemplated that due to requirements of large reflector area that the reflectors 28 will be positioned with their long axis in one fixed position while enabling vertical tracking under control of a drive shaft 34. For example, the parabolic reflector 28 would be suitably supported by any of conventional support means with the long axis of parabolic reflector 28 and heat collector 30 positioned in an earth east/west direction while enabling vertical positioning via input rotation to shaft 34. It is also foreseen that in many applications a considerable number of parabolic reflectors 28 will be utilized and controlled in parallel by one or more control systems and associated slave circuits to track the sun in order to capture maximum radiation and heat transfer to heat collector 30 and central heat utilization equipment. Some present technology calls for a great number of such heat reflectors suitably disposed over an area which may include a large number of acres. It should also be understood that the fixed direction or east/west mounting may also be varied in certain earth locations and terrain such that final disposition of the entire system would be in accordance with the exigencies of the particular application.

The radiation sensor 14 is suitably mounted by an affixure linkage 36 for coordinate movement with a parabolic reflector 28. An opaque radiation divider vane 38 is securely mounted on radiation sensor 14 and initially aligned along the central axis of the parabola defined by the cross-section of reflector 28. Output from radiation sensor 14 is then applied to control circuit 20 which, in turn, provides output of drive power to the drive system 22 to control rotation of the shaft 34 in either the clockwise or counterclockwise tracking directions, as will be further described below.

Figures 3, 4:
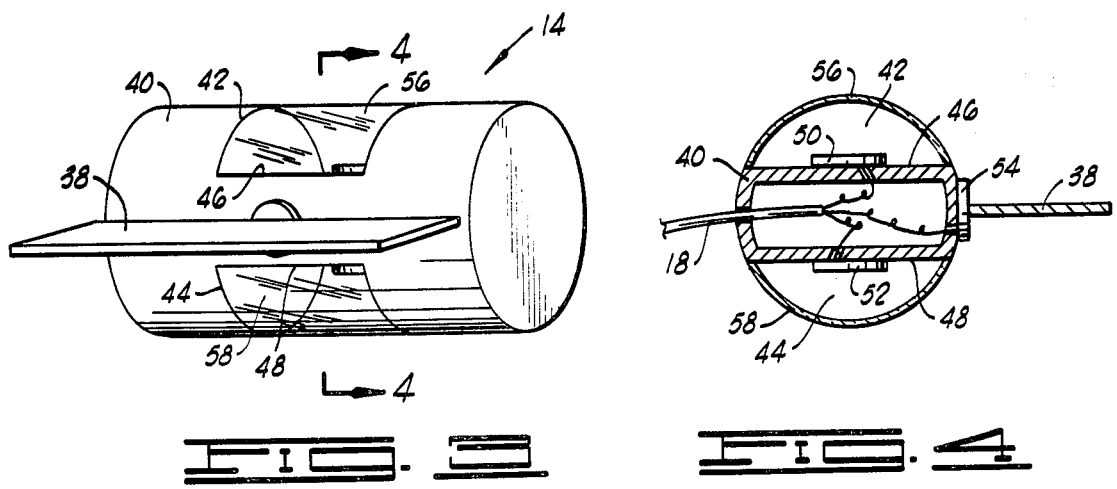
FIG. 3 is a perspective view of a radiation tracking sensor as utilized in the present invention.
FIG. 4 is a section taken along lines 4—4 of FIG. 3.

FIG. 3 illustrates a radiation sensor 14 which is formed to include a main housing 40, in this case, a cylindrical turned member, which is adapted to house a plurality of photoresponsive elements, as will be further described. Opposing side cutouts 42 and 44 are formed in opposite sides of housing 40 to form parallel, flat inner surfaces 46 and 48, (See also FIg. 4). A photoresponsive element 50 is then centrally seated and secured as by bonding on inner surface 46 with suitable electrical connection 52 extending to connector 18. In like manner, and oppositely oriented, a photoresponsive element 52 is centrally mounted and bonded on inner surface 48 with electrical connection via connector 18. A third photoresponsive element 54 is mounted on housing 40 in such manner that it is bisected by the vane 38, and element 54 is also connected for output via lead 18. The photoresponsive elements 50 and 52 are each covered over by a light diffusing shield 56 and 58, respectively, e.g. molded mylar optical elements, which serve to provide a family of constant response characteristic from the facing of photoresponsive elements 50 and 52. Thus, while photoresponsive elements 50 and 52 function to generate electrical indication of opposite looking sunlight characteristics, the vane-divided photoresponsive element 54 provides a differential output reading, as will be further described below, in accordance with the sun's positioning relative to alignment of vane 38. The photoresponsive elements 50, 52 and 54 may be such as the type VT 313 L2 photoresistors which are commercially availble from Vactec Manufacturing of St. Louis, Missouri.

Figure 5:
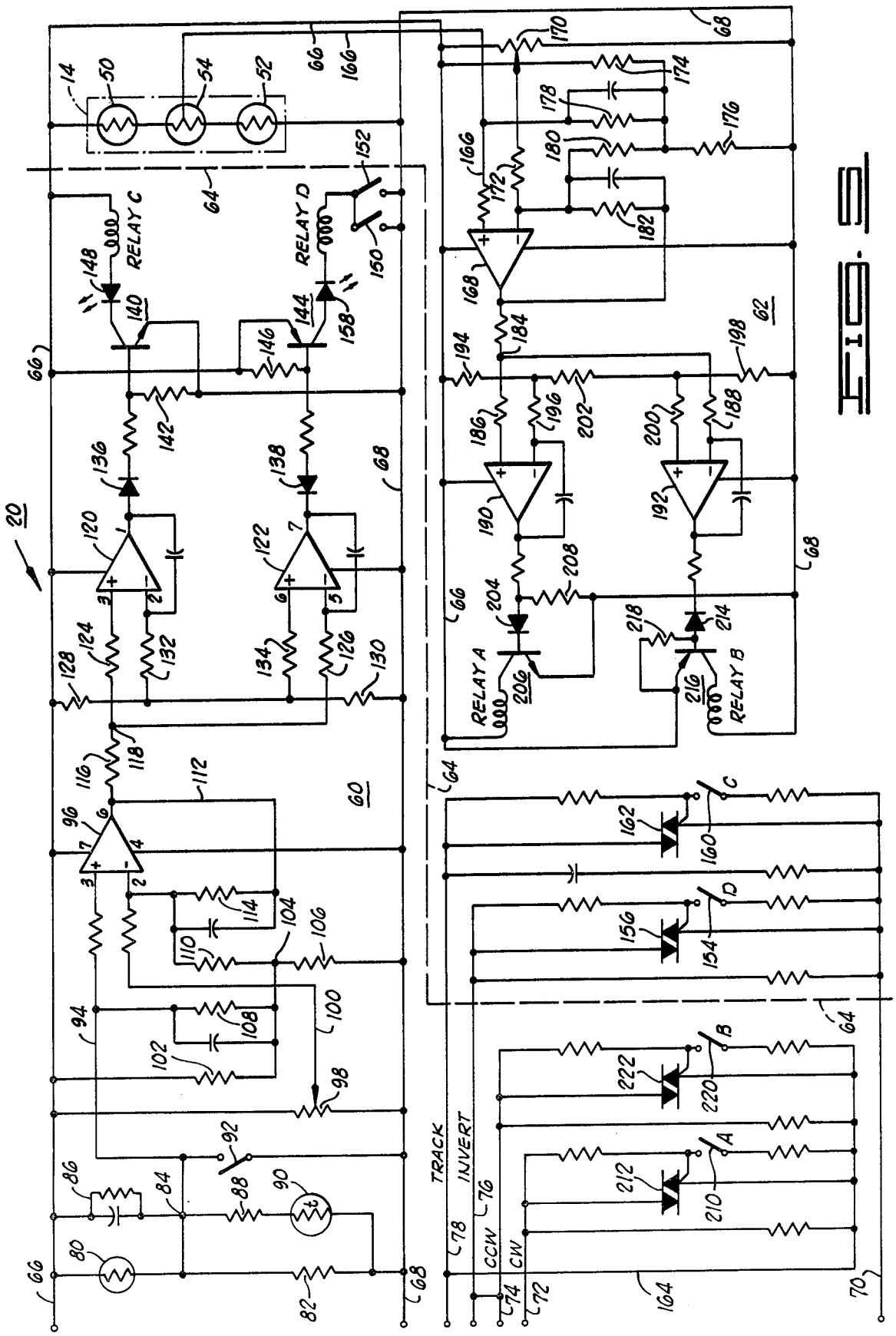
FIG. 5 is a schematic diagram of the control circuit of the present invention.

FIG. 5 illustrates control circuit 20 as divided into a threshold section 60 and tracking section 62 by dash-line 64. Control circuit 20 functions in response to B+ voltage as applied on lead 66, e.g. plus 12 volts D-C, and circuit return is by means of ground or common 68. Output energization from control circuit 20 to drive system 22 (See FIG. 1) is applied via lead 70 and a selected one of leads 72, 74, 76 and 78. As presently utilized, the output voltage to drive system 22 is A-C voltage with the line applied on lead 70 and circuit completed through a selected one of return leads 72, 74, 76 and 78, as will be further described. The output A-C voltage is then used to control a commercially available form of capacitor start, A-C split phase motor having the desirable attributes of rapid reversibility for control of the directional rotation of shaft 34 (FIG. 2). It is also contemplated that future installations will utilize D-C motors within drive system 22 to provide requisite clockwise or counterclockwise rotation of shaft 34.

The threshold section 60 of control circuit 20 functions in response to a single photoresponsive element 80 which is pre-adjusted to function about a set light level. The photoresponsive element 80 may be the same type as the aforementioned type VT 313 L2 (Vactek), and is positioned to face in a north direction to provide an average light level output response. Element 80 may be mounted either about the reflector 28, radiation sensor 14 or control circuit 20 so long as it is properly shielded to provide north-looking light level response. The element 80 is connected in series with a resistor 82 across B+ lead 66 and common 68 via a voltage divider junction 84. The junction 84 is further connected to B+ lead 66 by means of the resistor/capacitor network 84, and junction 84 is connected to common 68 through a resistor 8 and series-connected thermistor 90. Thermistor 90 is a negative coefficient thermistor located in heat conducting relationship to heat collector 30 to provide high temperature cut-out as a safety precaution. Junction 84 is also connected via a normally open, manually operated switch 92 to common 68 in order to provide selective automatic positioning of reflector 28 for washing or protective positioning, as will be further described.

Voltage developed in junction 84 is further conducted via lead 94 to the positive input of a differential amplifier 96. In present design, differential amplifier 96 is a type 741 integrated circuit operational amplifier with pin connection as shown. A potentiometer 98 is connected between B+ lead 66 and common 68 to provide adjustment of threshold level. Thus, the wiper element of potentiometer 98 selects a desired voltage level for input via lead 100 to the negative input of differential amplifier 96. Differential amplifier 96 is biased by means of a voltage divider consisting of resistor 102, junction 104 and resistor 196, with junction 104 connected through an R-C network 108 to the positive input of differential amplifier 96 and connected through a resistor 110 to the negative input of differential amplifier 96. Requisite feedback is accomplished by means of output lead 112 through R-C network 114 to the negative input of the amplifier.

Signal output developed by differential amplifier 96 is apparent across resistor 116 at junction 118 for input in opposite polarity to each of amplifiers 120 and 122. The amplifiers 120 and 122 are connected as inverting amplifiers as present on an integrated circuit dual-operational amplifier of type 558, individual pin connections being as shown. Junction 118 is connected via resistor 124 to one input of amplifier 120, and is connected via resistor 126 to the opposite input of amplifier 122. Each of the remaining inputs to amplifiers 120 and 122 are equally biased from voltage divider resistors 128 and 130 by means of input resistors 132 and 134. Thus, amplifiers 120 and 122 merely serve an on-off function with sensed positive output from amplifier 120 being applied through a diode 136 and sensed negative output from amplifier 122 being applied through diode 138.

Diode 136 is then applied to the base of an NPN transistor 140 that is connected common emitter and based-biased by a resistor 142. In like manner, but opposite polarity considerations, diode 138 is connected to the base of a PNP transistor 144 that is similarly connected with the base biased from B+ lead 66 by means of a resistor 146.

The collector of transistor 144 conducts through a light emitting diode 158 to energize relay D when NORMAL switch 150 is in the closed position. Switch 152, normally closed, constitutes a limit switch actuated mechanically to open when the reflector 28 is moved to its full counterclockwise limit, the washing or maintenance position. In either event, energization of relay D effects closure of the contacts 154 which, in turn, energize the gate electrode of a triac 156 to enable A-C conduction between the line lead 70 and control lead 76. It may also be noted that control lead 74 is shorted to control lead 76 so that A-C presence on lead 76 indicates an ambient light level below pre-set threshold at a central control panel and A-C energization of lead 74 is connected to the drive system 22 to effect counterclockwise rotation of drive shaft 34 and parabolic reflector 28 to its limit.

The collector of NPN transistor 140 finds conduction through a light emitting diode 148 to energize a relay C which closes the C contact 160 energizing the gate electrode of triac 162. With triac 162 conducting, the A-C line 70 is connected for energization with control lead 78, indicative of greater than sufficient ambient light threshold, which also enables A-C voltage on lead 164 for further triac control in response to tracking section 62, as will be further described below. The light emitting diodes 148 and 158 are located on a suitable centrally located control panel which enables operation and control of the system.

The tracking section 62 functions in response to radiation sensor 14 which includes the vane-shaded photoresponsive element 54 and the opposite looking diffused light photoresponsive elements 50 and 52 (see FIGS. 3 and 4). Elements 50, 52 and 54 are connected in series between B+ lead 56 and the common 68 with photoresponsive element 54 connected in the middle and being further center-tapped to provide output on a lead 166 to the positive input of the differential amplifier 168, e.g. also a type 741 operational amplifier similar to the amplifier 96 and having the same pin connections. A voltage dividing potentiometer 170 provides alignment control at the operating panel and selected output is applied through a resistor 172 to the remaining input of amplifier 168. The amplifier 168 is biased in the same manner as amplifier 96 and includes voltage dividing resistors 174 and 176 with input biasing by means of R-C network 178 and resistor 180. Control feedback is applied through an R-C network 182.

Differential voltage output from the amplifier 168 is apparent at a junction 184 whereupon it is then applied through resistors 186 and 188 to opposite inputs of respective amplifiers 190 and 192. Amplifiers 190 and 192 are similar to the previously discussed amplifiers 120 and 122, and may be the similar type 558 operational amplifier having the same pin connections and functioning in the on-off manner. The remaining input of amplifier 190 is biased from B+ lead 66 via a resistor 194 in series with resistor 196. In like manner, the remaining input of amplifier 192 is baised by common connected resistor 198 in series with resistor 200, and an interconnecting resistor 202, i.e., as between static inputs of amplifiers 190 and 192, provides a voltage difference therebetween in order to enable a non-track condition.

Output from amplifier 190 is then applied through a diode 204 to the base of an NPN transistor 206 that is connected common emitter and base-biased by resistor 208 to common 68. Collector conduction of transistor 206 energizes relay A to close the A contact 210 thereby to gate ON a triac 212 to complete the A-C circuit from lead 164 to control lead 72, the clockwise tracking control output. Indicative output from amplifier 192 is applied through a diode 214 for input to the base of a PNP transistor 216, also connected common emitter and base-biased from B+ lead 66 by means of a resistor 218. Collector conduction then energizes relay B to close the B contact 220 for energization of triac 222 to enable line voltage completion to the output control lead 74, the counterclockwise tracking control output.

OPERATION

The operation of the present invention is particularly described with respect to usage with solar tracking equipment similar to that illustrated in FIGS. 1 and 2. It should be understood too that a reflector 28 must exhibit optimum reflection characteristics, and exceptional care and attention must be extended to maintain such reflector service. In one present embodiment, the surface of reflector 28 is constituted of high polish alumimum sheet which is extremely expensive and which requires regular cleaning care and protection from elemental hazards, such as hail, dust storms, excessive nighttime dews, etc.

Thus, the control circuit of FIG. 5 works through operation of both the threshold section 60 and tracking section 62 to maintain all necessary controls of drive system 22 to properly manipulate reflector 28. The north-viewing photoresponsive element 80 seeks to produce a voltage level, as adjusted by sensitivity control 98, which indicates that it is daytime and that there is sufficient sunlight to justify operation and sun tracking. In the justified tracking condition, an increased positive voltage is seen at junction point 84 and lead 94 to amplifier 96, and the output from amplifier 96 serves to turn on amplifier 120 and to turn off amplifier 122. The positive going output from the amplifier 120 then energizes relay C by means of conducting transistor 140 thereby to close the C relay contact 160 to energize traic 162 and place A-C line voltage from lead 70 onto lead 78 and the enabling lead 164.

In the unjustified tracking condition, output from amplifier 96 serves to turn on amplifier 122 and to turn off amplifier 120 with similar energization of relay D and the D relay contact 154. This gates on triac 156 to place A-C voltage from lead 70 onto control leads 76 and 74, lead 74 being the counterclockwise tracking control lead. Lead 74 energizes the drive system 22 so that reflector 28 rotates in its counterclockwise rotation until it is completely in the inverted or protected position which will result in opening the limit switch 152 to de-energize relay D. In the inverted position, reflector 28 may then be washed or receive other maintenance, or it may be simply rotated in such manner for nighttime or storm positioning. The switch 92, shown in the normal position, may be actuated to its closed or "WASH" position, to ground input No. 3 of amplifier 96 thereby to actuate relay D, and this operation is available whenever manual control is expedient.

When the threshold section 60 indicates the justified or above threshold condition with control leads 78 and 164 energized, the tracking section 62 comes into play to enable incremental energization and tracking of sun's position. The tracking section 62 is responsive to radiation sensor 14 which includes the vane-shaded photoresponsive element 54 in series combination with opposite-viewing elements 50 and 52. Output is taken from the center tap of element 54 for input to amplifier 168, tracking sensitivity of which is derived from potentiometer 170. In normal northern hemisphere morning tracking, amplifier 168 provides periodic output through amplifier 190 to effect conduction of transistor 206 and relay A. The A relay contact 210 is then closed to energize triac 212 and to place A-C energization between lead 164 and clockwise control lead 72 to the drive system 22. The opposite is effected during afternoon tracking by periodic energization of amplifier 192 to effect conduction of transistor 216 and relay B. This then causes closure of the B relay contact 220 with energization of triac 222 from lead 164 to the counter-clockwise control lead 74 to drive system 22.

The foregoing discloses novel tracking control circuitry which enables new and useful functions contributing to greater maintenance and protective capabilities. It should be understood that while the circuit and drive control structure is illustrated with particular application to vertical plane tracking of sun position, there are many radiation responsive tracking systems which might utilize similar control circuitry in effecting the desired positioning, limit considerations and interactive control methods.

While the foregoing description is carried out in relation to a specific embodiment, it should be understood that the control system is capable of universal application, i.e., operation at any latitude or longitude with scanning control aligned in either East-West or North-South directions. Further, control systems may be compounded to enable complex planar scanning; and, the system will function with various types of radiation collectors and their associated drive systems.

Changes may be made in the combination and arrangement of elements as heretofore set forth in the specification and shown in the drawings, it being understood that changes may be made in the embodiments disclosed without departing from the spirit and scope of the invention as defined in the following claims.

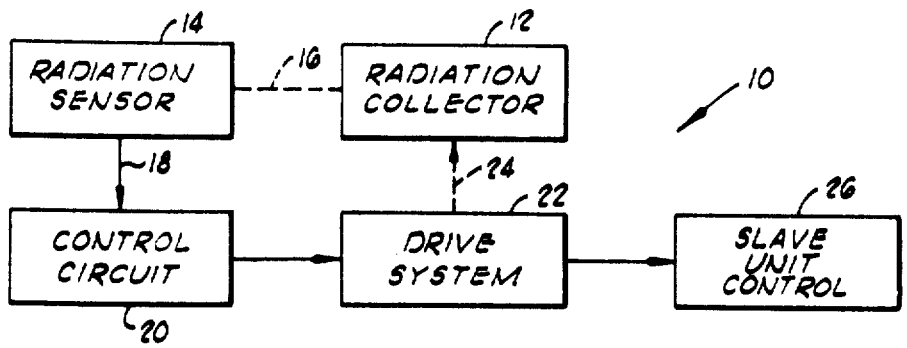

What is claimed is:

1. In a system of the type which tracks point source radiation through incremental drive adjustment of radiation directed structure, an improved electrical control system comprising:
a drive system connected to provide intermittent clockwise and conterclockwise movement to said radiation directed structure;
threshold sensing means which is a light responsive element shielded from direct view of said source of radiation and providing output signal that is indicative of presence or absence of sufficient ambient light level;
amplifier means connected to receive said threshold sensing means output signal and energized in response to output signal indicating presence of sufficient light level to effect actuation of a first relay means which enables a tracking drive voltage; and
radiation sensing means providing a first output voltage which energizes a second relay means to apply said enabled tracking drive voltage to said drive system for clockwise tracking movement of said radiation directed structure, and said radiation sensing means providing an alternative second output voltage which energizes a third relay means to connect said enabled tracking drive voltage to said drive system to effect counterclockwise movement of said radiation directed structure.

2. An improved control system as set forth in claim 1 which is further characterized to include:
second amplifier means connected to said threshold sensing means and responsive to insufficient light level to actuate a fourth relay means which enables tracking drive voltage to said drive system to provide counterclockwise movement to said radiation directed structure.

3. An improved control system as set forth in claim 2 which further includes:
limit switch means actuated upon full counterclockwise movement of said radiation directed structure to deactivate said fourth relay with the radiation directed structure in a protected position.

4. An improved control system as set forth in claim 2 wherein said threshold sensing means and first and second amplifier means comprises:
photoresponsive sensing means shielded from direct view of said radiation source and providing a voltage output indicative of ambient light level;
operational amplifier means receiving said voltage output and providing a first output signal indicative of greater than a pre-set light level and providing a second output signal indicative of less than a pre-set light level;
a first amplifier conductive in response to said first output signal to actuate said first relay means; and
a second amplifier conductive in response to said second output signal to actuate said fourth relay means.

5. An improved control system as set forth in claim 1 wherein said radiation sensing means includes:
first and second photoresponsive elements secured to said radiation directed structure and opppositely viewing at ninety degrees relative to the direction of the radiation source;
first and second light diffuser elements disposed to cover the respective first and second photoresponsive elements;
a third photoresponsive element secured to said radiation directed structure and disposed for direct view of the radiation source; and
opaque vane means secured to bisect said third photoresponsive element as directed perpendicularly therefrom.

6. An improved control system as set forth in claim 1 wherein said radiation sensing means comprises:
photoresponsive sensing means providing a variable voltage output when radiation source position varies from one side to the other from direct perpendicular thereto;
operational amplifier means receiving as input said photosensitive sensing means variable voltage output to generate first and second differential output voltages indicative of said radiation source position;
first control amplifier means conductive in response to said first differential output voltage to energize said second relay means; and
second control amplifier means conductive in response to said second differential output voltage to energize said third relay means.

7. An improved control system as set forth in claim 1 wherein said radiation sensing means includes:
first and second photoresponsive elements secured to said radiation directed structure and oppositely viewing at ninety degrees relative to the direction of the radiation source;
first and second light diffuser elements disposed to cover the respective first and second photoresponsive elements;
a third photoresponsive element secured to said radiation directed structure and disposed for direct view of the radiation source; and opaque vane means secured to bisect said third photoresponsive element as directed perpendicularly therefrom.

8. An improved control system as set forth in claim 7 wherein:
said first, second and third photoresponsive elements are connected in series as a voltage divider network with the third photoresponsive element connected in the center of the network and having a center tapped output for conducting said first and second output voltages to energize said respective second and third relay means.

9. In a system of the type which tracks point source radiation through incremental drive adjustment of radiation directed structure, an improved electrical control system comprising:
a drive system connected to provide intermittent clockwise and counterclockwise movement to said radiation directed structure;
first and second photoresponsive elements secured to said radiation directed structure and oppositely viewing at ninety degrees relative to the direction of the radiation source;
first and second light diffuser elements disposed to cover the respective first and second photoresponsive elements;
a third photoresponsive element secured to said radiation directed structure and disposed for direct view of the radiation source, said third element being connected in series between said first and second photoresponsive elements and having a center tap providing an output voltage;
opaque vane means secured to bisect said third photoresponsive element as directed perpendicularly therefrom; and
amplifier means including first relay means energized in responsive to said output voltage to apply tracking drive voltage to said drive system for clockwise tracking movement, and alternately providing a second output voltage which energizes a second relay means to apply tracking drive voltage to said drive system to effect counterclockwise movement of said radiation directed structure.

10. An improved control system as set forth in claim 9 wherein said amplifier means further comprises:
operational amplifier means receiving as input said third photoresponsive sensing means variable voltage output to generate first and second differential output voltages indicative of said radiation source position;
first control amplifier means conductive in response to said first differential output voltage to energize said first relay means; and
second control amplifier means conductive in response to said second differential output voltage to energize said second relay means.

* * * * *

UNITED STATES PATENT AND TRADEMARK OFFICE
CERTIFICATE OF CORRECTION

PATENT NO. : 4,151,408

DATED : April 24, 1979

INVENTOR(S) : Russell L. Brown, et al

Page 1 of 2

It is certified that error appears in the above–identified patent and that said Letters Patent are hereby corrected as shown below:

The title page should be deleted to insert the attached title page therefor.

Signed and Sealed this

Ninth Day of October 1979

[SEAL]

Attest:

RUTH C. MASON
*Attesting Officer*

LUTRELLE F. PARKER
*Acting Commissioner of Patents and Trademarks*

United States Patent [19]

Brown et al.

[11] 4,151,408

[45] Apr. 24, 1979

[54] SUN TRACKING CONTROL SYSTEM

[75] Inventors: Russell L. Brown, Oklahoma City; Charles M. Burton, Edmond, both of Okla.

[73] Assignee: Brown Manufacturing Company, Oklahoma City, Okla.

[21] Appl. No.: 664,261

[22] Filed: Mar. 5, 1976

[51] Int. Cl.² .............................................. G01J 1/20
[52] U.S. Cl. ................................ 250/203 R; 126/270; 356/152
[58] Field of Search ............... 250/203 R, 208, 210, 250/237 R, 201; 126/270, 271; 356/152, 141

[56] References Cited

U.S. PATENT DOCUMENTS

| 3,177,367 | 4/1965 | Brown | 250/203 R |
| 3,308,299 | 3/1967 | Dardarian | 250/203 R |
| 3,917,942 | 11/1975 | McCay | 250/203 R |

Primary Examiner—Alfred E. Smith
Assistant Examiner—David K. Moore
Attorney, Agent, or Firm—Laney, Dougherty, Hessin & Beavers

[57] ABSTRACT

A control circuit for tracking of a heat radiation source which functions to maintain heat collection structure in optimum alignment with the source thereby to enable maximum efficiency of heat collection; the control circuit includes a threshold circuit for sensing ambient light level to provide enablement control to A-C power circuitry which energizes the heat collector orienting drive system, and the threshold circuit also functions to automatically invert the heat collector to a protected position upon detection of insufficient threshold voltage; and, the circuit further comprises a tracking section energized by a radiation sensor to cause intermittent energization of the drive system to further enable intermittent bi-directional tracking movement of the heat collector, such tracking circuitry being enabled by detection of sufficient threshold voltage.

10 Claims, 5 Drawing Figures